Nov. 12, 1946.    D. G. GRISWOLD    2,410,876
PILOT CONTROLLED PRESSURE REGULATING MEANS
Filed May 29, 1943    4 Sheets-Sheet 1

Inventor
Donald G. Griswold
By Baron & Thomas
Attorneys

Nov. 12, 1946.   D. G. GRISWOLD   2,410,876
PILOT CONTROLLED PRESSURE REGULATING MEANS
Filed May 29, 1943   4 Sheets-Sheet 2

Inventor
Donald G. Griswold
By Bacon + Thomas
Attorneys

Nov. 12, 1946.   D. G. GRISWOLD   2,410,876
PILOT CONTROLLED PRESSURE REGULATING MEANS
Filed May 29, 1943   4 Sheets-Sheet 3

Inventor
Donald G. Griswold
By Bacon + Thomas
Attorneys

MAIN AND BY-PASS VALVES OPEN

MAIN VALVE CLOSED, BY-PASS VALVE OPEN

MAIN VALVE CLOSED, BY-PASS VALVE CLOSING

MAIN AND BY-PASS VALVES CLOSED

Patented Nov. 12, 1946

2,410,876

UNITED STATES PATENT OFFICE 2,410,876

PILOT CONTROLLED PRESSURE REGULATING MEANS

Donald G. Griswold, Alhambra, Calif.

Application May 29, 1943, Serial No. 489,006

14 Claims. (Cl. 50—10)

The present invention relates to fluid flow control apparatus, and more particularly to a novel arrangement of valves and control means for use in a pipe line in which it is desired to automatically maintain a regulated, predetermined line pressure, with a minimum of wear and servicing of the valves.

It has been found that, in pressure regulated pipe lines of fairly large capacity, excessive and undesirable wear occurs on the packing and seat of the pressure regulating valve due to the frequent opening and closing of said valve to meet relatively small demands. As a result of such wear, the valve leaks slightly, accurate regulation is unobtainable, and frequent servicing of the valve becomes necessary.

The present invention overcomes the above difficulties by providing an auxiliary or by-pass valve of small capacity for by-passing fluid around a pressure regulating or main valve of relatively large capacity, said by-pass valve being arranged to operate in accordance with pressure variations in the outlet opening of the main valve and to be controlled in its operation by a combined pressure responsive device and pilot valve which simultaneously controls both the pressure regulating valve and the by-pass valve. The control means is such that when a small demand occurs, only the by-pass valve opens and its extent of opening will vary with the small demand, but in the event that a greatly increased demand occurs, then the main valve will also open. The control means is still further arranged so that both valves can open simultaneously in response to a sudden great demand.

The control means for the main and by-pass valves is also such that the pressure regulator and by-pass valves operate in a predetermined sequence, both during opening and closing. Thus, when there is a demand on the outlet side of the main or pressure regulator valve, the by-pass valve will open first to meet such demand. However, if the by-pass valve cannot supply the demand when fully opened, the main valve will then open. As the demand diminishes, the control means will first cause the main valve to completely close, permitting the by-pass valve to handle any relatively small remaining demand, and then effect the complete closing of the by-pass valve when the demand ceases. It will be clear, therefore, that the by-pass valve opens before the main valve, and the main valve closes before the by-pass valve.

The control means of the present invention is not limited to use with valves of different capacity.

In some instances, both the main and by-pass valves may have the same capacity, as when one of the valves is installed as a stand-by for emergency use. In that event, one of the valves will handle all demands and the other valve will function only in the event that said one valve fails to open.

The principal object of the invention is to provide automatic fluid flow control apparatus, for use in water pipe lines and the like, in which valve wear and servicing is reduced to a minimum.

Another object of the invention is to provide control means for a plurality of valves, which will cause said valves to open and close in different predetermined sequences.

A further object of the invention is to provide, in a supply line, a pair of valves of different capacity and control means for said valves arranged so that one of the valves can by-pass fluid around the other to take care of small demands without requiring said other valve to open.

A still further object of the invention is to provide, in a pipe line, a pair of valves and control means for the valves arranged so that one of said valves will handle all of the flow through the pipe line with which said valves are associated, and the other of said valves will be operated only as an emergency valve in the event that the first-mentioned valve fails to operate.

Other objects and advantages of the invention will be apparent from the following description, taken in conjunction with the accompanying drawings, in which:

Figures 12 to 15, inclusive, are diagrammatic views showing various relative positions of the passageways in the pilot disc and the ports in the pilot disc seat during the complete cycle of operation of the main and by-pass valves, the size of said ports being exaggerated to facilitate illustration. More specifically.

Figure 1:
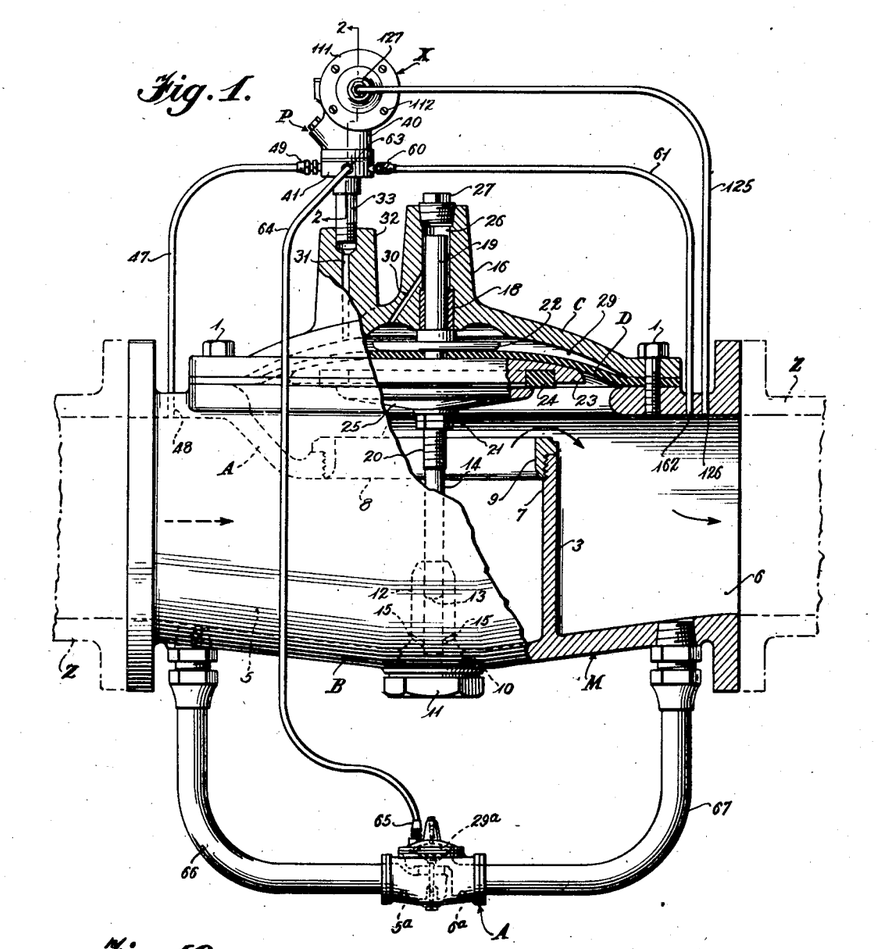
Figure 1 is a view partly in section of a large capacity main valve and a relatively small capacity auxiliary or by-pass valve and automatic control means for controlling the opening and closing of both of said valves in a desired sequence.

Referring to Fig. 1 of the drawings, the main valve is generally indicated by the letter M, the auxiliary or by-pass valve by the letter A, the pilot valve by the letter P, and the pressure responsive means for actuating said pilot valve by the letter X.

The main valve M is connected in a pipe line Z and includes a body B, a cover C, and a circular diaphragm D whose marginal portion is clamped between said body and cover by a suitable number of cap screws 1. The body B is provided with a substantially vertical partition wall 3 which cooperates with an inclined wall portion 4 to provide inlet and outlet chambers or openings 5 and 6, respectively, in said body. The wall portions 3 and 4 are merged to provide a circular opening 7 which is threaded and adapted to receive an annular valve seat 8. The valve seat 8 is provided with a circular opening 9 through which water or other liquid can pass in travelling from the inlet chamber 5 to the outlet chamber 6.

The valve body B has a threaded opening 10 axially aligned with the opening 9 in the valve seat 8. An elongated plug 11 is threaded into the opening 10 and includes a tubular guide portion 12 for the lower end 13 of a valve stem 14. Ports 15 extend through the guide portion 12 and connect the interior thereof with the inlet chamber 5, whereby resistance to downward movement of the valve stem 14 by fluid within the guide 12 is precluded.

The cover member C is provided with a central boss portion 16 suitably counterbored to receive a bushing 18 for the upper end 19 of the valve stem 14. The bushing 18 is arranged so that it is in axial alignment with the plug 11 and serves as a guide for the upper end of the valve stem 14. The valve stem 14 has a threaded portion 20 intermediate the ends thereof adapted to receive nuts 21 for clamping followers 22 and 23 in position upon opposite sides of the diaphragm D and for retaining an annular sealing ring 24 in position in the follower 23 by means of a clamping member 25.

The boss 16 of the cover member C has a passageway 26, which serves as a housing for the upper end 19 of the valve stem 14 and is closed by a plug 27. The cover C is also provided with a cavity 29 adapted to receive operating fluid under pressure for actuating the diaphragm D. The cover C is still further provided with a passageway 30 establishing free communication between the diaphragm pressure chamber 29 and the passageway 26 in the boss 16 surrounding the upper end 19 of the valve stem 14. This arrangement precludes possible entrapment of fluid in the boss 16 which otherwise might interfere with the upward movement of the valve stem 14. Fluid under pressure may be admitted into and exhausted from the diaphragm chamber 29 by means of a passageway 31 in a boss 32 formed upon the cover member C, the lower end of the passageway 31, of course, communicating with the chamber 29. A pipe nipple or conduit 33 is threaded into the upper end of the boss 32 and serves as a mounting means for the pilot valve P.

The pilot valve P (Fig. 2) includes a housing 40 which is secured to a combined fluid distributing base and adapter member 41 by machine screws 42, a gasket 43 being interposed between said housing and adapter to prevent leakage. The base member 41 has a hollow depending boss 44 threaded to receive the upper end of the pipe nipple 33.

Figures 2, 3, 4:
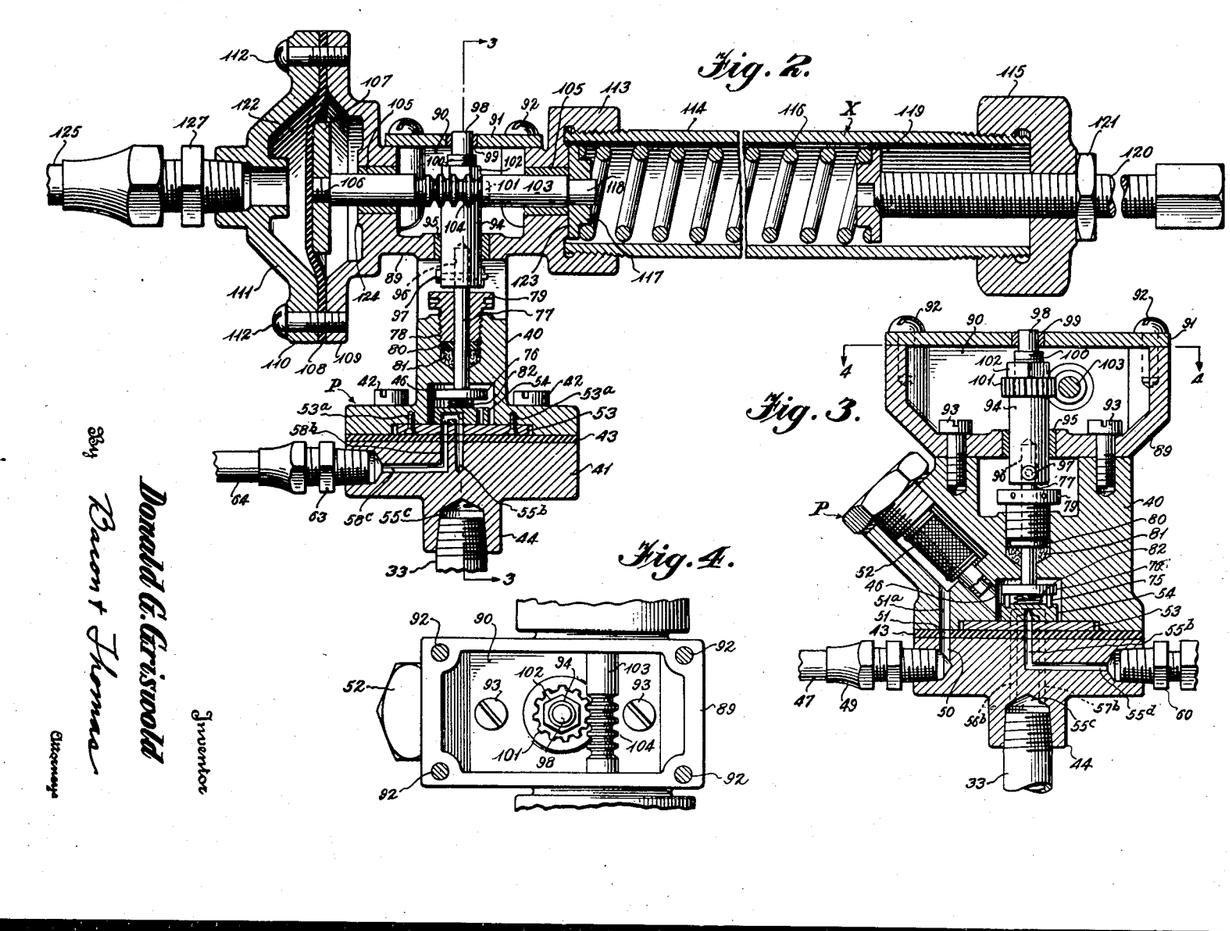
Figure 2 is an enlarged sectional elevational view of the valve control means, taken on the line 2—2 of Figure 1.
Figure 3 is a sectional elevational view of the valve control means taken on the line 3—3 of Figure 2.
Figure 4 is a fragmentary plan view of the valve control means taken on the line 4—4 of Figure 3.

The pilot valve housing 40 contains a pilot disc chamber 46 which is continually subjected to the pressure of the fluid in the inlet chamber 5 of the main valve, the fluid being conducted from said inlet chamber through a section of conduit 47 arranged externally of the main valve 1, one end 48 of said conduit being suitably connected with the valve body B and the opposite end of said conduit being connected by a conventional fitting 49 with the base member 41, said base member having a channel 50 for delivering fluid to a passageway 51 in the gasket 43 and a passageway 51ª in the pilot valve housing 40. A strainer 52 is so arranged in the housing 40 that all liquid introduced through the passageway 51ª must pass through said strainer before it can enter the pilot disc chamber 46. The strainer 52 prevents the entrance of foreign matter into the pilot valve with the operating fluid and thus assures trouble-free operation and non-clogging of the pilot valve.

The pressure fluid or pilot disc chamber 46 is formed at the lower end of the pilot valve housing 40, and the open end of said chamber is closed by a circular plate 53 serving as a seat for a rotatable pilot disc 54. The seat 53 may be secured to the housing 40 in any conventional manner, as by screws 53ª, and is provided with a central or axial port 55 (Fig. 8) and with ports 56, 57 and 58 spaced a predetermined radial distance from the port 55 and arranged upon radii 120° apart. The gasket 43, of course, is provided with suitable openings 55ª to 58ª (Fig. 9) which register with the ports 55 to 58, respectively. The base member 41 (Fig. 10) is provided with an axial passageway 55$^b$ which communicates with the port 55 in the pilot disc seat 53 and with passageways 56$^b$ to 58$^b$ which register with the ports 56 to 58, respectively, of said seat.

The passageways 56$^b$ and 57$^b$ in the base member 41 both communicate at their lower ends in an enlarged central passage 55$^c$ in the boss 44 into which the pipe nipple 33 is threaded (see Fig. 3), so that both the passageways 56$^b$ and 57$^b$ communicate with the diaphragm chamber 29 of the main valve and provide dual passage means for rapidly admitting and exhausting fluid from said chamber. The axial passageway 55$^b$ in the base 41 communicates with a radial passageway 55$^d$ having a pipe fitting 60 mounted in the outer end thereof and connected with one end of a drain tube 61, the other end of said drain tube being preferably suitably connected at 62 with the outlet opening 6 of the main valve M.

The passageway 58$^b$ of the base member 41 communicates with a radial passageway 58$^c$ having a pipe fitting 63 mounted in the outer end thereof. The fitting 63 is connected to one end of a tube 64, the opposite end of which communicates through a fitting 65 (Fig. 1) with the diaphragm chamber 29$^a$ of the auxiliary or by-pass valve A. Incidentally, the by-pass valve A may be of identically the same general construction as the main valve M, and corresponding parts will therefore be given the same numbers as those of the main valve but with the letter "a" used as a prime. Thus, it will be noted that the inlet chamber 5$^a$ of the by-pass valve A is connected with the inlet chamber 5 of the main valve M by a section of pipe 66 and that the outlet opening 6$^a$ of said by-pass valve is connected by a second section of pipe 67 with the outlet opening 6 of the main valve.

Figures 5, 6, 7, 8, 9, 10, 11:
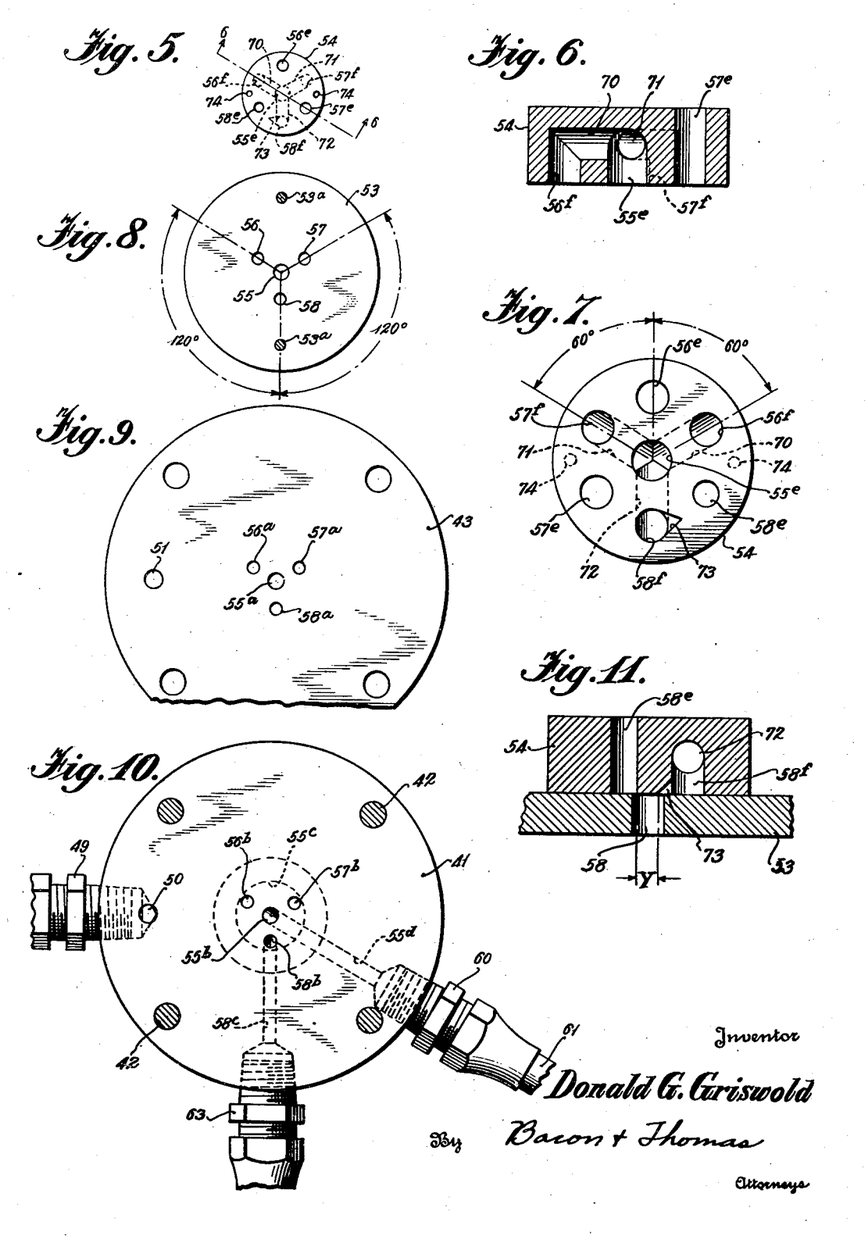
Figure 5 is a plan view of the pilot disc of the pilot valve.
Figure 6 is an enlarged transverse sectional view through the pilot disc taken on the line 6—6 of Figure 5.
Figure 7 is an enlarged, inverted view of the pilot disc.
Figure 8 is a plan view of the pilot disc seat.
Figure 9 is a plan view of the gasket which is normally disposed below the pilot seat.
Figure 10 is a plan view of the fluid distributing base of the pilot valve.
Figure 11 is a sectional view showing the relationship between the passageways in the pilot disc controlling the by-pass valve and a cooperating port in the pilot disc seat, whereby under certain conditions communication between said passageways in said pilot disc is effected by the port in the pilot disc seat.

As is best shown in Figs. 5 to 7, the pilot disc 54 is provided with two pressure or through-passageways 56$^e$ and 57$^e$ which are adapted to simultaneously register with the ports 56 and 57 in the pilot disc seat 53 and a relatively small pressure or through-passageway 58$^e$ adapted to register with the port 58 in said pilot disc seat. The passageways 56$^e$ and 57$^e$ control the admission of operating fluid under pressure into the diaphragm chamber 29 of the main valve M and the passageway 58$^e$ controls the admission of operating fluid to the pressure chamber 29$^a$ of the by-pass valve A. The pilot disc 54 is also provided with three U-shaped exhaust passageways 70, 71 and 72 which terminate at one end in a common axially extending leg portion 55$^e$ which is in constant registration with the port 55 in the seat 53. The U-shaped exhaust passageway 70 has an outer leg portion 56$^f$ adapted to register with the port 56 in the seat 53 and the U-shaped exhaust passageway 71 has an outer leg portion 57$^f$ adapted to register with the port 57, to effect exhaust of operating fluid from the diaphragm chamber 29 of the main valve M. Similarly, the U-shaped exhaust passageway 72 has an outer leg 58$^f$ adapted to register with the port 58 in the seat 53, which communicates with the diaphragm chamber 29$^a$ of the by-pass valve A, whereby to exhaust spent operating fluid from said by-pass valve. The leg 58$^f$, however, is provided with a notched portion 73 extending in a clockwise direction (Fig. 5) from the leg 58$^f$ toward the passageway 58$^e$. The notch 73 terminates from the passageway 58$^e$ a distance Y, less than the diameter of the port 58 in the seat 53, as shown in Fig. 11. The purpose of this arrangement will be more fully explained hereinafter.

It will be observed that the through-passageways 56$^e$ and 57$^e$, and the exhaust passageways 70 and 71 in the pilot disc 54 are in duplicate to cooperate with the dual passageways 56$^b$ and 57$^b$ in the base member 41. The object of the dual passageways is to facilitate the opening and closing operations of the main valve M. It will be understood, however, that one group of these passageways may be omitted without effecting the operativeness of the invention. It will also be noted that the passageways 56$^e$, 57$^e$, 70 and 71 constitute one set of passageways for controlling the main valve M, and that the passageways 58$^e$ and 72 constitute another set of passageways for controlling the by-pass valve A, both of said sets of passageways being formed in the single pilot disc 54.

The pilot disc 54 is further provided with a pair of apertures 74 adapted to receive pins 75 (Fig. 3) depending from a drive washer 76 mounted upon one end of a vertical pilot shaft 77. The shaft 77 extends through an opening 78 in the housing 40 and is surrounded by an adjustable packing gland 79, the lower end of which engages a washer 80 to compress a body of packing 81 into sealing engagement with said shaft to prevent the escape of operating fluid under pressure from the pilot disc chamber 46. A spring 82 surrounds the shaft 77 and is interposed between the drive washer 76 and the top of the pilot disc 54. The purpose of the spring 82 is to urge the drive washer downwardly to hold the pilot disc 54 against the seat 53 in order to avoid inadvertent movement of said pilot disc away from said seat. The spring 82 ordinarily is not essential inasmuch as the pressure of the operating fluid in the chamber 46 tends to maintain the pilot disc tight against its seat. However, in the event of low pressure or pressure failure the spring 58 will keep the pilot disc 54 seated so that no foreign matter, if it should happen to be present, can get between it and the seat 53.

As has been previously indicated, the pilot valve P is operable by a pressure-responsive device X. The rotation of the pilot disc 54, accordingly, is controlled by a diaphragm operated mechanism which will now be described.

Referring to Figs. 2 to 4, the mechanism X includes a casing 89 provided with a chamber 90, and a cover plate 91 which forms a closure for said chamber. The cover plate 91 is secured to the casing 89 by a plurality of screws 92. As is best shown in Fig. 3, the casing 89 is mounted upon the pilot valve housing 40 by means of machine screws 93, the heads of which are received in the chamber 90. A sleeve 94 extends through a bushing 95 mounted in the bottom wall of the casing 89 and is recessed as indicated at 96 to receive the upper end of the pilot shaft 77. A pin 97 serves to connect the sleeve 94 and the shaft 77 in relative non-rotatable relation. The sleeve 94 has an upper extremity 98 received in a bushing 99 in the cover plate 92. The sleeve 94 is further provided with an intermediate portion which is at least partially threaded as indicated at 100. A gear 101 is received upon said intermediate portion and is clamped in non-rotatable relation to the sleeve 94 by a nut 102 cooperating with the threaded portion 100. The gear 101 is adapted to be rotated through an angle of 60° by a reciprocable rod 103 provided with annular ridges 104, which convert a portion of said rod into a rack to effect turning movement of the gear 101. Turning of the gear 101 necessarily causes rotation of the sleeve 94 and the pilot disc shaft 77.

The rod 103 is disposed at right angles to the sleeve 94 and is slidably mounted in bushings 105 secured in opposed side walls of the casing 89, as best shown in Fig. 2. One end of the rod 103 is reduced and threaded as indicated at 106 and carries a circular plate 107 which engages one side of a flexible pilot diaphragm 108. The diaphragm 108 is marginally secured between a flange 109 formed integral with the casing 89 and a flange 110 formed upon a cover plate 111, the cover plate 111 and the casing 89 being secured together by a suitable number of screws 112.

The casing 89 is also provided with an internally threaded annular flange 113 adapted to receive one end of a pipe nipple 114. The opposite end of the pipe nipple 114 is received in an internally threaded cap member 115. A helical compression spring 116 is disposed within the pipe nipple 114 and one end of said spring rests against a washer 117 mounted upon a shouldered end 118 of the rod 103. The opposite end of the spring 116 engages a washer 119 abutting against the extremity of an adjusting bolt 120 threadedly mounted in the cap 115. The bolt 120 is adapted to be adjusted to vary the compression of the spring 116 to regulate the pressure at which the valves A and M will operate under the control of the pilot valve P. The bolt 120 can be locked in any desired position of adjustment by a lock nut 121 arranged to be jammed against the cap 115. The action of the spring 116 is to urge the rod 103 toward the left, as viewed in Fig. 2, to cause clockwise rotation of the pilot disc 54 to effect opening of the valves A and M in a sequence to be described hereinafter.

The cover plate 111 is shaped so as to provide a compartment 122 at one side of the pilot diaphragm 108 adapted to receive operating fluid under pressure to effect flexing of said diaphragm and shifting of the rod 103 toward the right, to turn the pilot disc 54 counter-clockwise to effect closing of the valves A and M in a predetermined sequence described hereinafter. The adjustment of the spring 116 determines the pressure that must be attained in the pilot diaphragm chamber 122 to overcome the force of said spring before shifting of the rod 103 toward the right can take place.

The movement of the rod 103 toward the left by the spring 116 is limited by the engagement of the washer 117 (Fig. 2) with the wall surface 123 of the casing 89, and the movement of said rod toward the right by fluid pressure on the diaphragm 108 is limited by the engagement of the plate 107 with the wall surface 124. Thus, the stroke of the rod 103 in both directions is definitely limited so that the pilot disc 54 is turned through exactly the right angle (60°) necessary to position the passageways of said pilot disc in cooperating relation with the ports in the pilot disc seat 53.

The fluid under pressure for actuating the pilot diaphragm 108 is taken from the outlet opening 6 of the main valve M and is conducted from said opening by a small pipe 125 having one end connected to said main valve at 126 and its other end connected to a fitting 127 mounted in the cover plate 111.

The ports 56 and 57 in the seat 53, as has been previously indicated, cooperate in parallel with the passageways in the pilot disc 54 to effect opening and closing of the main valve M. Thus, when the U-shaped exhaust passageways 70 and 71 of the pilot disc 54 are in registration with the ports 56 and 57 of the seat 53 as diagrammatically shown in Fig. 12, the valves A and M are both open and spent operating fluid will have flowed from the diaphragm chamber 29 of the main valve M through the passageway 31 in the boss 32, through the conduit 33, the enlarged passageway 55c and the passageways 56b and 57b communicating therewith in the base member 41, through the passageways 56a and 57a in the gasket 43, the ports 56 and 57 in the pilot disc 53, then through the exhaust passageways 70 and 71 in the pilot disc 54 and into the axial passageway 55e of said pilot disc, the axial port 55 in the pilot seat 53, the axial passageway 55a in the gasket 43, through the axial passageway 55b and the radial passageway 55d in the base 41, thence into fitting 60, drain tube 61 and finally into the outlet opening 6 of the main valve.

The U-shaped exhaust passageway 72 in the pilot disc 54 simultaneously registers with the port 58 in the pilot seat 53 so that spent operating fluid from the by-pass valve A will have been exhausted from the diaphragm chamber 29a of said valve through the fitting 65, tube 64 and fitting 63 into the radial passageway 58c and the vertical passage 58b in the base member 41, then through passageway 58a in the gasket 43, port 58 in the pilot seat 53, through the U-shaped exhaust passageway 72 and then into the axial exhaust port 55 of the pilot seat to be finally discharged through the drain tube 61 in the same manner and along with the exhaust fluid from the main valve.

Figure 14:
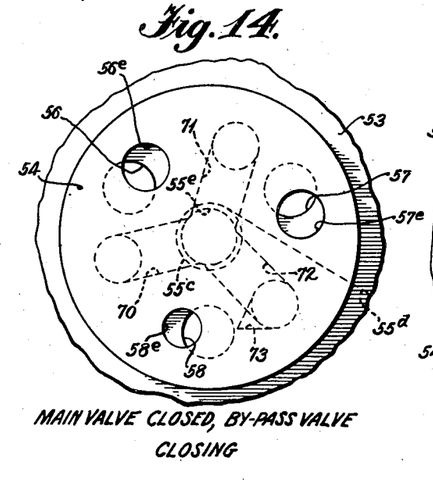
Figure 14 illustrates the relative position of the passageways and ports when the main valve is fully closed and the by-pass valve is gradually closing.
Figure 15:
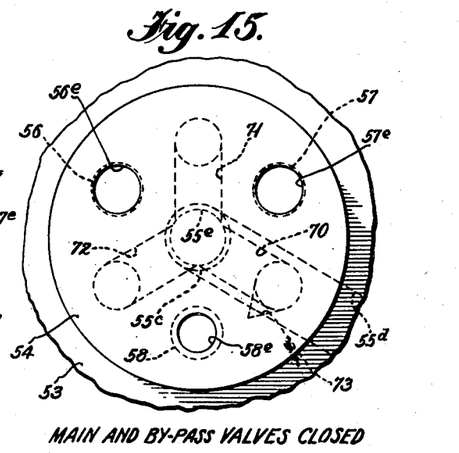
Figure 15 illustrates the relative position of the passageways and ports when the main valve and by-pass valve are fully closed.

Assuming now that the demand in the line Z decreases, the pressure in the outlet chamber or opening 6 of the main valve M will gradually build up and be communicated through the conduit 125 to the compartment 122 to increase the pressure therein sufficient to flex the pilot diaphragm 108 toward the right against the resistance offered by the pressure regulating spring 116. As the pilot diaphragm 108 is thus flexed, the rod 103 will be shifted toward the right, causing counter-clockwise rotation of the pilot disc 54. When the demand in the line Z is such that the main valve need not be open to meet it, the pilot disc 54 will have been rotated to the position diagrammatically shown in Fig. 13, wherein the through-passageways 56e and 57e are shown in registration with the ports 56 and 57 in the pilot seat 53 so that operating fluid then passes from the pressure chamber 46 into the diaphragm chamber 29 of the main valve M effecting closing of said main valve. The through-passage 58e in the pilot disc 54 also registers with the port 58 in the pilot seat 53 so that fluid under pressure would also flow to the diaphragm chamber 29a of the auxiliary or by-pass valve A except for the fact that the notched portion 73 of the exhaust passageway 72 overlaps the port 58 to such extent as to bleed off operating fluid faster than it is being supplied through the passageway 58e. Hence, complete closing of said by-pass valve A does not occur under these conditions, but some modulation to suit the demand may occur in accordance with the pressure acting upon the diaphragm 108. By virtue of this arrangement, the main valve M will be fully closed before the by-pass valve A starts to close. However, as the demand further decreases and the pressure in the chamber 122 increases, the pilot disc 54 will be further rotated counter-clockwise to the position shown in Fig. 14, wherefrom it will be seen that the notched portion 73 has been moved out of registration with the port 58, seepage into the exhaust passage 72 no longer can occur, and all of the fluid passing through the passageway 58ᵉ passes through the port 58 to the diaphragm chamber 29ᵃ to effect closing of the by-pass valve A. Of course, the main valve M is held closed by the registration of the pilot disc passageways 56ᵉ and 57ᵉ with the seat ports 56 and 57. Further decrease in demand with corresponding increase in pressure in the outlet opening 6 of the main valve will eventually move the rod 83 to the end of its stroke and the pilot disc 54 will take the position shown in Fig. 15 and maintain the valves A and M closed.

Figures 12, 13:
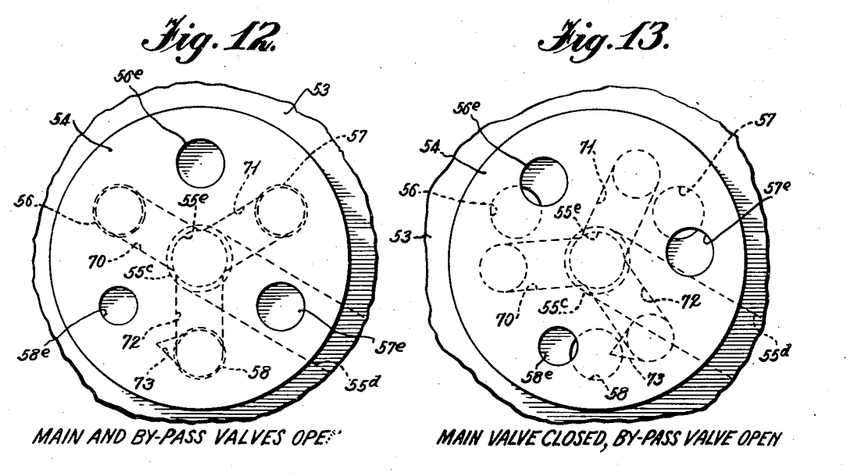
Figure 12 illustrates the position of the passageways in the pilot disc relative to the ports in the pilot seat when both the main and by-pass valves are wide open.
Figure 13 is a view similar to Figure 12 but showing the relative position of the passageways and ports when the main valve is fully closed and the by-pass valve is still wide open.

Assume, further, that a demand occurs in the line Z, the pressure will drop in the outlet opening 6 of the main valve M and a corresponding pressure drop will occur in the compartment 122 associated with the pilot diaphragm 108. As the pressure drops in the compartment 122, the spring 116 forces the rod 103 toward the left, imparting clockwise rotation to the pilot disc 54. When the pilot disc is rotated to a position with respect to its seat, such as illustrated in Fig. 13, it will be apparent that the notched portion 73 of the pilot disc 54 and the passage 58ᵉ again communicate simultaneously with the port 58 in the pilot seat so that operating fluid from the diaphragm chamber 29ᵃ in the by-pass valve A begins to escape and said by-pass valve starts to open. As the demand becomes greater the notched portion 73 moves further into registration with the port 58 with the result that the valve A opens fully. Such full opening occurs before the exhaust passageways 70 and 71 register with the ports 56 and 57. In other words before the main valve M starts to open. As the demand becomes still greater, the pressure in the compartment 122 becomes lower and the pilot valve disc 54 will be further actuated clockwise until the exhaust passages 70 and 71 in said pilot disc register with the ports 56 and 57, at which time the main valve M will start to open to supplement the flow through the by-pass valve A. Closing of the valves M and A takes place with decrease in demand as previously explained.

It will thus be seen that the main valve M and the by-pass valve A open in a given predetermined sequence and that said valves close in a different predetermined sequence. In other words, the by-pass valve A opens before the main valve M and the main valve M closes before the by-pass valve A. However, it will be apparent that both valves can open simultaneously in response to a sudden large demand.

Figure 16:
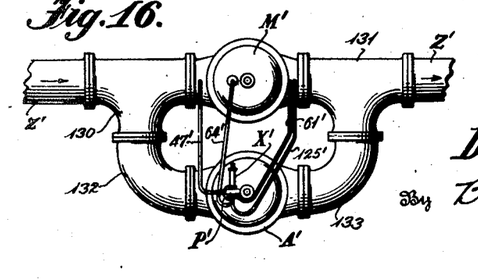
Figure 16 illustrates a modification of the invention in which the main and by-pass valves are of the same capacity and wherein one of the valves serves merely as an emergency valve to operate in the event that the other valve fails to open.

Figure 16 diagrammatically illustrates valves M' and A' of the same capacity controlled by a pilot valve and pressure responsive means P'—X' similar to that shown in Figs. 1 to 4. When valves of the same size are used, it is not feasible to mount one upon the other or to directly connect their inlet and outlet openings by piping, as in Fig. 1. Instead, T-fittings 130 and 131 may be connected with the inlet and outlet ends, respectively, of the valve M'. An elbow 132 may serve to connect the stem of the T-fitting 130 with the inlet side of the by-pass valve A' and a second elbow 133 to connect the stem of the T-fitting 131 with the outlet side of said by-pass valve.

With the valve arrangement shown in Fig. 16, it is preferable to have the valve M' open and close to meet all demands, inasmuch as it is disposed directly in the line of flow through the principal pipe line Z'. Accordingly, the valve A' is associated with the control P'—X' so that it serves as a true stand-by or emergency valve. To this end, the pilot valve P' and the pressure responsive device X are preferably mounted upon the by-pass valve A' and arranged so that the valve M' will open first. However, in the event that the valve M' fails to open for any reason, then the control device X' will respond to the pressure drop on the outlet side of the valve M' and actuate the pilot P' in the same manner previously described, to effect opening of the by-pass valve A'.

While the control means P'—X' is mounted upon the by-pass valve A', operating fluid for the pilot valve P' is taken from the inlet side of the valve M' through a conduit 47', and exhaust fluid from the pilot valve is drained back into the outlet side of the valve M' through a drain tube 61'. Similarly, the pressure responsive device X' is connected with the outlet side of the main valve by a conduit 125'. In order that the valve M' will be opened first, the conduit 64' is connected with the diaphragm chamber of the valve M'.

It will be understood, of course, that the sequence of operation of the valves M' and A' will be such that the valve A' normally will not open, but in the event of an emergency will open after the valve M' should have fully opened, and will close before the valve M' would normally close. Thus, the same sequence of operation of main and by-pass valve is maintained in the arrangement shown in Fig. 16 as in the arrangement in Fig. 1.

It will be apparent from the foregoing that the present invention provides means whereby slight variations in demand in a water supply line, for example, will not necessitate the frequent opening and closing of a large or main valve with its accompanying wear on the seat and packing.

It will also be apparent that the control means of the present invention is equally applicable to a pair of valves of the same capacity and when so used will cause the by-pass valve to automatically function as a stand-by or emergency valve.

It will be understood that various changes in construction may be made in both the main pressure regulator valve and the by-pass valve and in the means for controlling the same in the sequence disclosed herein without departing from the spirit of the invention or the scope of the annexed claims.

I claim:

1. A fluid flow control apparatus including a pair of valves, one of which is arranged to by-pass fluid around the other; pilot valve means for simultaneously controlling the opening and closing of said valves, said pilot valve means including a ported pilot element provided with two sets of passageways, one set for controlling each of said valves, the passageways of one set being arranged to provide a delayed closing action for one of said valves, whereby one valve will always be closed later than, and opened prior to, the other of said valves.

2. Fluid flow control apparatus comprising: a pair of pressure fluid operable valves; means connecting one of said valves in by-passing relation to the other; pressure responsive means operatively connected with the outlet side of one of said valves and being operable in accordance with changes in pressure on said outlet side; and pilot valve means for controlling the exhaust and supply of operating fluid from and to said pair of valves actuated by said pressure responsive means for controlling the opening and closing of said valves in predetermined order.

3. Fluid flow control apparatus comprising: a pressure fluid operable valve of large capacity; a pressure fluid operable valve of relatively small capacity; means connecting said second mentioned valve in by-passing relation with said first-mentioned valve; and control means in the form of a combined pilot valve and pressure responsive device operable in accordance with pressure changes in said first-mentioned valve for simultaneously controlling the exhaust and supply of operating fluid from and to both of said valves, said control means being arranged to effect opening of said valve of small capacity prior to opening of said valve of large capacity and to effect closing of said valve of large capacity prior to closing of said valve of small capacity.

4. Fluid flow control apparatus comprising: a fluid pressure operable main pressure regulating valve having inlet and outlet openings and closure means actuated toward closed position by operating fluid under pressure controlling the flow between said openings; a relatively small fluid pressure operable auxiliary valve having inlet and outlet openings and closure means actuated toward closed position by operating fluid under pressure for controlling the flow between said openings; means exteriorly of said valves interconnecting the inlet openings of said main and auxiliary valves; means exteriorly of said valves interconnecting the outlet openings of said main and auxiliary valves; and control means responsive to pressure changes in the outlet opening of said main pressure regulating valve for effecting the opening of said auxiliary valve prior to the opening of said main valve and for effecting closing of said valves in the reverse order.

5. Fluid flow control apparatus comprising: a fluid pressure operable main valve having inlet and outlet openings and closure means actuated toward closed position by operating fluid under pressure controlling the flow between said openings; a relatively small fluid pressure operable by-pass valve having inlet and outlet openings and closure means actuated toward closed position by operating fluid under pressure for controlling the flow between said last-named openings; a pipe interconnecting the inlet openings of said main and by-pass valves; a second pipe interconnecting the outlet openings of said main and by-pass valves; and control means responsive to the pressure in one of said openings of said main valve for effecting the opening and closing of said main and by-pass valves, said control means being arranged to effect opening of said by-pass valve prior to opening of said main valve and to effect closing of said main valve prior to closing of said by-pass valve.

6. Fluid flow control apparatus comprising: a hydraulically operable main pressure regulating valve having inlet and outlet openings and a closure member controlling the flow between said openings; a hydraulically operable auxiliary valve having inlet and outlet openings and a closure member controlling the flow between said openings; a pipe interconnecting the inlet openings of said main and auxiliary valves; a second pipe interconnecting the outlet openings of said main and auxiliary valves; and a pilot valve responsive to pressure changes in the outlet opening of said main pressure regulating valve controlling the exhaust and supply of operating fluid from and to said main and auxiliary valves to effect opening and closing of said main and auxiliary valves, said pilot valve being arranged to effect opening of said auxiliary valve prior to opening of said main valve and to effect closing of said main valve prior to closing of said auxiliary valve.

7. Fluid flow control apparatus comprising: a main pressure regulating valve having inlet and outlet openings, a closure member, and a diaphragm connected with said closure member for controlling the flow between said openings; an auxiliary valve having inlet and outlet openings, a closure member, and a diaphragm connected with said closure member for controlling the flow between said openings; a pipe interconnecting the inlet openings of said main and auxiliary valves; a second pipe interconnecting the outlet openings of said main and auxiliary valves; and a pilot valve responsive to pressure changes in the outlet opening of said main pressure regulating valve for controlling the opening and closing of said main and auxiliary valves in accordance with pressure variations in said outlet opening, said pilot valve being arranged to exhaust operating fluid from the diaphragm chamber of said auxiliary valve prior to exhausting operating fluid from the diaphragm chamber of said main valve whereby to effect opening of said auxiliary valve prior to opening of said main valve.

8. Fluid flow control apparatus comprising: a main pressure regulating valve having inlet and outlet openings, a closure member, and a diaphragm connected with said closure member for controlling the flow between said openings; a by-pass line operatively associated with said main valve; a by-pass valve connected in said line having inlet and outlet openings, a closure member, and a diaphragm connected with said closure member for controlling the flow between said openings; and a pilot valve responsive to pressure changes in the outlet opening of said main pressure regulating valve for controlling the opening and closing of said main and by-pass valves in accordance with pressure variations in said outlet opening, said pilot valve including a ported element arranged to exhaust operating fluid from the diaphragm chamber of said by-pass valve prior to exhausting operating fluid from the diaphragm chamber of said main valve, whereby to effect opening of said by-pass valve prior to opening of said main valve, and to admit operating fluid under pressure into the diaphragm chamber of said main valve to effect closing of said main valve prior to admitting operating fluid into the diaphragm chamber of said by-pass valve, whereby to effect closing of said main valve prior to closing of said by-pass valve.

9. A fluid flow control apparatus including a pair of pressure fluid operable valves, one of which is arranged to by-pass fluid around the other: pilot valve means for simultaneously controlling the opening and closing of said valves, said pilot valve means including a housing having a chamber adapted to contain operating fluid under pressure, a rotatable pilot disc in said chamber, said rotatable pilot disc having two sets of passageways, one set for controlling each of said valves, each of said sets including a through passageway and a U-shaped exhaust passageway, and a pilot disc seat cooperable with said pilot disc having a port adapted to continuously communicate with one of said valves and to alternately communicate with the passageways of said first set of passageways and also having a second port adapted to continuously communicate with the other of said valves and to alternately communicate with the passageways of said second set of passageways, said pilot disc seat also having a port simultaneously communicating with the exhaust passageways of both of said sets of passageways, the exhaust passageway of said second set of passageways including a portion extending toward its associated pressure passageway, said portion terminating from said pressure passageway a distance less than the dimension of said second port in said pilot disc seat, whereby said pressure and exhaust passageways of said second set of passageways can simultaneously register with said second port to provide a delayed closing action of the valve controlled by said second set of passageways.

10. Fluid flow control apparatus comprising: a main pressure regulating valve having inlet and outlet openings; a closure member, and a diaphragm connected with said closure member for controlling the flow between said openings; a by-pass line operatively associated with said main valve; a by-pass valve connected in said line having inlet and outlet openings, a closure member, and a diaphragm connected with said closure member for controlling the flow between said openings; and a pilot valve for controlling the opening and closing of said main and by-pass valves, said pilot valve including a housing having a chamber for operating fluid under pressure, a rotatable pilot disc in said chamber, said pilot disc having two sets of passageways, each of said sets of passageways including at least one pressure passageway and one exhaust passageway, one of said sets of passageways controlling the closing and opening of said main valve and the other of said sets of passageways controlling the closing and opening of said by-pass valve, and a pilot disc seat having a port successively registrable with said first set of passageways and communicating with the diaphragm chamber of said main valve, said pilot disc having a second port successively registrable with the second set of passageways and communicating with the diaphragm chamber of said by-pass valve, said pilot disc seat also having an exhaust port in continuous communication with the exhaust passageway of said two sets of passageways, the exhaust passageway of said second set of passageways including a notched portion extending toward its associated pressure passageway, said notch terminating from said passageway a distance less than the dimension of said second port, whereby operating fluid can leak through said pressure passageway into the exhaust passageway of said second set of passageways via said second port without effecting closing of said by-pass valve.

11. Fluid flow control apparatus comprising: a main pressure regulating valve having inlet and outlet openings, a closure member, and a diaphragm connected with said closure member for controlling the flow between said openings; a by-pass line operatively associated with said main valve; a by-pass valve connected in said line having inlet and outlet openings, a closure member, and a diaphragm connected with said closure member for controlling the flow between said openings; and pilot valve means for controlling the opening and closing of said main pressure regulating valve and said by-pass valve, said pilot valve means including a housing having a pilot chamber and a ported pilot element in said chamber, means for supplying operating fluid under pressure to said pilot chamber, conduit means for conducting operating fluid under pressure from said pilot chamber to the diaphragm chamber of said main valve, tube means for conducting operating fluid under pressure from said pilot chamber to said diaphragm chamber of said by-pass valve; and means for effecting actuation of said ported pilot element in response to pressure changes in the outlet opening of said main valve.

12. Fluid flow control apparatus comprising: a main pressure regulating valve having inlet and outlet openings, a closure member, and a diaphragm connected with said closure member for controlling the flow between said openings; a by-pass line operatively associated with said main valve; a by-pass valve connected in said line having inlet and outlet openings, a closure member, and a diaphragm connected with said closure member for controlling the flow between said openings; pilot valve means for controlling the opening and closing of said main pressure regulating valve and said by-pass valve, said pilot valve means including a housing having a pilot disc chamber and a rotatable, ported pilot disc in said chamber, means for supplying operating fluid under pressure to said pilot disc chamber, means including a conduit for conducting operating fluid under pressure from said pilot disc chamber to the diaphragm chamber of said main valve, means including a tube for conducting operating fluid under pressure from said pilot disc chamber to said diaphragm chamber of said by-pass valve; and means for effecting rotation of said pilot disc in response to pressure changes in the outlet opening of said main valve.

13. Fluid flow control apparatus comprising a main pressure regulating valve having inlet and outlet openings, a closure member, and a diaphragm connected with said closure member for controlling the flow between said openings; a by-pass line operatively associated with said main valve; a by-pass valve connected in said line having inlet and outlet openings, a closure member, and a diaphragm connected with said closure member for controlling the flow between said openings; pilot valve means for controlling the opening and closing of said main pressure regulating valve and said by-pass valve, said pilot valve means including a housing having a pilot disc chamber and a rotatable, ported pilot disc in said chamber, a conduit for supplying operating fluid under pressure to said pilot disc chamber, means including a conduit for conducting operating fluid under pressure from said pilot disc chamber to the diaphragm chamber of said main valve, means including a tube for conducting operating fluid under pressure from said pilot disc chamber to said diaphragm chamber of said by-pass valve; and means for effecting rotation of said pilot disc in response to pressure changes in the outlet opening of said main valve including a casing carrying a pilot diaphragm and having a compartment on one side of said diaphragm, a pipe establishing communication between said compartment and said outlet opening of said main valve, yieldable means on the opposite side of said pilot diaphragm opposing the pressure on the first-mentioned side of said pilot diaphragm, and means including a reciprocable rod connected with said diaphragm for converting reciprocating movement of said rod into rotary movement of said pilot disc.

14. Fluid flow control apparatus comprising: a pair of fluid pressure operable valves, each of said valves including disc means for shutting off the flow therethrough and means actuated by operating fluid under pressure for urging said disc means toward seated position, one of said valves having a flow capacity much smaller than that of the other; means exteriorly of said valves connecting said one valve in by-passing relation to the other, whereby opening of said one valve to allow flow around the other valve will serve to meet a small flow demand without requiring the disc means of said other valve to leave its seat; and automatic means responsive to pressure conditions at one side of the valve of large flow capacity controlling the opening of said valves in a given predetermined sequence to meet variations in flow demand arranged so that one valve is opened prior to said other valve to meet small flow demands before said other valve is opened to meet demands greater than the flow capacity of said one valve and the closing of said valves is effected in a reverse order as the flow demand decreases.

DONALD G. GRISWOLD.